US010848261B1

(12) United States Patent
Oldacre (10) Patent No.: US 10,848,261 B1
(45) Date of Patent: Nov. 24, 2020

(54) SYSTEMS AND METHODS FOR IDENTIFYING ROGUE OPTICAL NETWORK UNITS IN OPTICAL NETWORKS WITH WAVELENGTH-DIVISION MULTIPLEXING

(71) Applicant: ADTRAN, Inc., Huntsville, AL (US)

(72) Inventor: Jared Lee Oldacre, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 16/057,453

(22) Filed: Aug. 7, 2018

(51) Int. Cl.
*H04B 10/079* (2013.01)
*H04J 14/02* (2006.01)
*H04B 10/03* (2013.01)

(52) U.S. Cl.
CPC .......... *H04J 14/0257* (2013.01); *H04B 10/03* (2013.01); *H04B 10/0795* (2013.01); *H04B 10/0799* (2013.01); *H04B 10/07957* (2013.01); *H04J 14/0245* (2013.01); *H04J 14/0249* (2013.01)

(58) Field of Classification Search
None
See application file for complete search history.

(56) References Cited

U.S. PATENT DOCUMENTS

| | | | | |
|---|---|---|---|---|
| 7,016,608 B1* | 3/2006 | Ball | ..................... | H04J 14/0204 14/204 |
| 7,818,648 B2* | 10/2010 | Haran | .................. | H04B 10/077 398/78 |
| 7,907,843 B2* | 3/2011 | Yamaji | .................. | H04J 3/1694 398/100 |
| 8,582,969 B1* | 11/2013 | Sandstrom | ........... | H04B 10/503 398/17 |
| 9,350,447 B1 | 5/2016 | Detwiler et al. | | |
| 9,391,712 B2* | 7/2016 | Luo | ....................... | H04B 10/564 |
| 9,439,131 B2 | 9/2016 | Rudolph et al. | | |
| 9,806,807 B1 | 10/2017 | Sandstrom et al. | | |

(Continued)

OTHER PUBLICATIONS

Nakamura et al: "40Gbit/s—tunable stacked-WDM/TDM-PON using dynamic wavelength and bandwidth allocation", OFC 2011, Mar. 6-11, 2011, paper OThT4, pp. 1-3.*

*Primary Examiner* — Li Liu
(74) *Attorney, Agent, or Firm* — Maynard Cooper & Gale, P. C.; Jon E. Holland (57) ABSTRACT

A system identifies rogue optical network units (ONUs) on a passive optical network that uses time and wavelength division multiplexing. An optical line terminal (OLT) is configured to recognize the occurrence of errors on the upstream transmission over the network. When those errors reach a predetermined threshold, the OLT attempts to identify potential rogue ONUs by controlling the ONUs to tune to different wavelengths. The OLT first controls the ONUs to transmit on a first wavelength. The OLT then iteratively divides the ONUs into multiple groups, each group being assigned a different wavelength for upstream transmission. The OLT them monitors upstream transmission to determine which group of ONUs is exhibiting rogue behavior. This process is repeated until a small group of ONUs is isolated as a potential rogue. The potentially rogue ONUs are individually analyzed and one or more ONUs is positively identified. The system then tunes the rogue ONUs to one or more isolated channels so as not to interfere with communication by other ONUs.

10 Claims, 7 Drawing Sheets

(56) References Cited

U.S. PATENT DOCUMENTS

| | | | |
|---|---|---|---|
| 2007/0092256 A1* | 4/2007 | Nozue | H04J 14/0282 14/282 |
| 2007/0098406 A1* | 5/2007 | Bernard | H04J 3/1694 398/72 |
| 2008/0138064 A1* | 6/2008 | O'Byrne | H04B 10/0793 398/25 |
| 2011/0069955 A1 | 3/2011 | Hajduczenia et al. | |
| 2011/0087925 A1* | 4/2011 | Haran | H04B 10/077 714/37 |
| 2011/0129214 A1 | 6/2011 | Zheng | |
| 2013/0034356 A1* | 2/2013 | Luo | H04B 10/272 398/72 |
| 2013/0156423 A1* | 6/2013 | Zhang | H04Q 11/0067 398/35 |
| 2015/0365191 A1* | 12/2015 | Lee | H04J 14/0246 14/246 |
| 2016/0073180 A1* | 3/2016 | Khotimsky | H04Q 11/0067 398/34 |
| 2016/0226618 A1* | 8/2016 | Lee | H04B 10/572 |
| 2017/0026111 A1* | 1/2017 | Yoo | H04B 10/03 |

\* cited by examiner

Example: 1 Rogue – ONU 5

| Round | Primary Channel | Secondary Channel | Notes |
|---|---|---|---|
| 0 | 0 1 2 3 4 5 6 7 | n/a | |
| 1 | 4 5 6 7 | 0 1 2 3 | |
| 2 | 6 7 | 0 1 2 3 4 5 | |
| 3 | 4 5 | 0 1 2 3 6 7 | |
| 4 | 5 | 0 1 2 3 6 7 4 | |
| 5 | 4 | 0 1 2 3 6 7 5 | ONU 5 (detected) |
| 6 | 0 1 2 3 4 6 7 | 5 | Rogue moved to secondary |

FIG. 7B

Example: 1 Rogue – ONU 1

| Round | Primary Channel | Secondary Channel | Notes |
|---|---|---|---|
| 0 | 0 1 2 3 4 5 6 7 | n/a | |
| 1 | 4 5 6 7 | 0 1 2 3 | |
| 2 | 4 5 6 7 0 1 | 2 3 | |
| 3 | 4 5 6 7 2 3 | 0 1 | |
| 4 | 7 5 6 7 2 3 0 | 1 | |
| 5 | 4 5 6 7 2 3 1 | 0 | ONU 1 (detected) |
| 6 | 0 2 3 4 5 6 7 | 1 | Rogue moved to secondary |

US 10,848,261 B1

SYSTEMS AND METHODS FOR IDENTIFYING ROGUE OPTICAL NETWORK UNITS IN OPTICAL NETWORKS WITH WAVELENGTH-DIVISION MULTIPLEXING

RELATED ART

A passive optical network (PON) typically has a point-to-multipoint architecture in which an optical line terminal (OLT) is coupled to a plurality of optical network units (ONUs) via a shared optical fiber. To increase the bandwidth of upstream network traffic, a PON may be designed to use time-division multiplexing, in which an OLT assigns each ONU timeslots in which the ONU is permitted to transmit across the PON to the OLT. In some implementations, the OLT contains logic that monitors upstream traffic loads for the ONUs and delegates the assignment of timeslots based on service priority and the monitored traffic loads. The OLT may use an embedded control channel to communicate to the ONUs, via a bandwidth map, the timing at which they are permitted to transmit. Therefore, in the upstream direction, only one ONU transmits on the fiber at a particular assigned time.

A PON designed under an NG-PON2 architecture may employ a tunable architecture using wavelength-division multiplexing, in which a multiplicity of signals can be transmitted simultaneously over different wavelengths on the single shared fiber. For each frame of data, an OLT in such a PON transmits a bandwidth map to each ONU, specifying timeslots for upstream transmission. ONUs in this type of PON have tunable optic components that allow them to receive a bandwidth map from an OLT, and, based on the OLTs instructions, direct upstream transmission on the fiber using one of a multiplicity of wavelengths. This architecture allows for increased network bandwidth.

In circumstances where an error has occurred at an ONU, the faulty ONU may begin transmitting outside of its allocated timeslots, or otherwise misbehaving. Such problems may be due to errors or faults at the ONU, such as an equipment malfunction or a software bug, or due to other causes. Transmission in a TWDM PON is rigorously managed, with multiple ONUs being scheduled to transmit on a single shared fiber and timeslots for upstream transmission being strictly assigned. Because of this, an improperly behaving ONU may transmit in timeslots that have been allocated for another ONU, thereby interfering with transmission from the other ONU or even knocking the other ONU off the PON. A faulty ONU that causes these types of errors is referred to as a "rogue" or "babbling" ONU.

An OLT may be able to recognize that rogue behavior is occurring over the PON based on transmission errors, but may have difficulty identifying which of the multiple ONUs is rogue. What is more, even if an OLT could identify which of multiple ONUs is the source of rogue behavior, if the rogue ONU is unable to receive or respond to commands sent to it by the OLT, the OLT may be unable to prevent that rogue ONU from interfering with network communication simply by commanding the rogue ONU to change its behavior.

One known solution to address this is to include in an ONU a watchdog circuit that monitors upstream and/or downstream communications and disables the ONU when rogue behavior is detected. However, watchdog circuits may not always be reliable. Sometimes the problem causing the rogue behavior in an ONU (such as a hardware failure where an ONU's laser is on all the time) may prevent its watchdog circuit from effectively disabling the ONU, or even accurately identifying it as the source of the problem. Further, even if a rogue ONU can be disabled, that disabling can result in a service interruption for a customer.

Accordingly, further techniques for reliably identifying and isolating rogue ONUs are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for protecting optical networks from rogue optical network units (ONUs). In some embodiments, a passive optical network (PON) using an NGPON2 architecture includes an optical line terminal (OLT) comprising between one and four channel terminations (each associated with a particular channel, or wavelength pair) coupled to a plurality of ONUs. Each ONU is connected to a respective subscriber line that connects to one or more transceivers located at a customer's premises. A channel termination at the OLT controls the tuning of ONUs, directing their transmission to particular wavelength pairs. The OLT also includes an OLT controller that coordinates between the OLT's channel terminations. The OLT controller, together with the channel terminations, is configured to detect rogue activity by ONUs on the PON and to identify a rogue ONU via an iterative grouping of the ONUs referred to herein as the Binary Rogue Detection Algorithm.

During an iteration of the Binary Rogue Detection Algorithm, the OLT controller divides a set of ONUs into two discrete groups, with all members of one group transmitting on the same line over a collective wavelength that is different than that of the other group. The OLT controller and the channel terminations then monitor the upstream transmissions of the ONUs in each of the two groups, identifying whether communication problems are occurring in the transmission of either group, and, if significant problems exist (e.g., a significant number of transmission errors), which group they occur in. By modifying the clustering of the ONUs in each group through successive iterations (during which each group of ONUs is collectively transmitting on one of two bandwidths) and monitoring the successive upstream bursts, the OLT controller can pare down the pool of potential rogue ONUs, eventually pinpointing a single ONU as the rogue. The OLT controller then moves the other, well-behaving ONUs to one or more wavelengths different than the wavelength used by the rogue ONU, effectively isolating the transmissions of the rogue ONU from the rest of the PON. Thus, a rogue ONU, transmitting on its own isolated wavelength, is prevented from interfering with the transmissions by the other ONUs across the PON.

Figure 1:
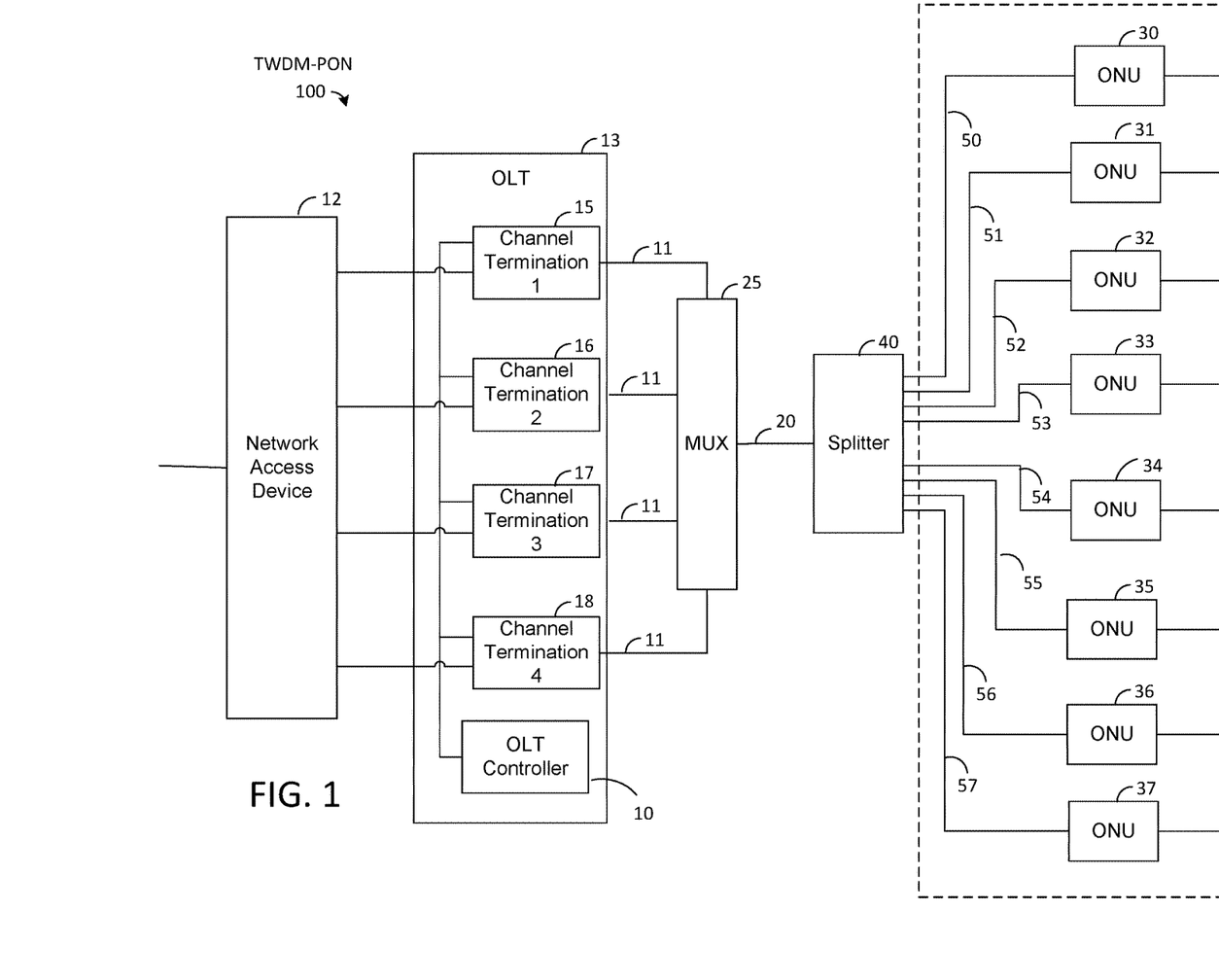
FIG. 1 is a block diagram illustrating an exemplary passive optical network in accordance with the present disclosure.

FIG. 1 depicts an exemplary embodiment of an optical network 100 for communicating data. In the embodiment shown by FIG. 1, the optical network 100 is a time and wavelength-division multiplexed passive optical network (TWDM-PON or, for simplicity of reference herein, PON), but other types of optical networks are possible in other embodiments. The network access device 12 receives data packets from a telecommunication network (not shown) or combinations of networks to be transmitted across the PON 100, in accordance with one or more known communication protocols. The network access device 12 transmits the data packets to an OLT 13, which includes a plurality of channel terminations 15, 16, 17, and 18 that communicate upstream/downstream through optical fibers 11. Each channel termination is made of circuitry individually dedicated to communication over a particular channel, viz., a transmitter/receiver configured to communicate over a particular wavelength pair, among other components described below.

Each channel termination 15-18 is configured to receive an electrical signal defining downstream data and to convert the signal from the electrical domain to the optical domain for communication through the PON 100. Each channel termination 15-18 is further configured to encapsulate the data in accordance with a known optical protocol, such as NG-PON2, and to communicate the data downstream via an optical signal to the ONUs. The channel terminations 15-18 also communicate control information to the ONUs, such as bandwidth maps and information pertaining to transmission protocols. In the exemplary embodiment, in order to prevent data collisions in the downstream traffic, each channel termination 15-18 transmits a downstream optical signal at a different wavelength than that of the downstream optical signals transmitted by the other channel terminations. The components of the channel terminations 15-18 will be described further below with reference to FIG. 2A.

The OLT 13 also includes an OLT controller 10 capable of communicating with each of the channel terminations 15-18, so as to, for example, coordinate switching ONUs between channels.

As shown by FIG. 1, each channel termination 15-18 is coupled to a wavelength multiplexer (MUX) 25 by a respective optical fiber 11. The wavelength MUX 25 may combine downstream optical signals from the multiple channel terminations 15-18 for transmission through the optical fiber 20, which is shared by all the channels of the OLT. The optical fiber 20 is coupled to at least one optical splitter 40 that is configured to split each downstream optical signal into multiple components that are respectively transmitted to the ONUs 30-37 through optical fibers 50-57.

It will be understood that while FIG. 1 shows four channel terminations 15-18 and one OLT controller 10 housed in a single OLT 13, one wavelength MUX 25, one optical splitter 40, and eight ONTs 30-37, a PON 100 may have any number of OLTs, channel terminations, OLT controllers, wavelength MUXs, optical splitters, and ONUs in other embodiments, or may not include one or more components. For example, the PON may be designed with stand-alone devices, similar to conventional single-channel OLTs, where each stand-alone device is directed to a different channel and each being connected to a single external OLT controller. In addition, while each of the channel terminations, OLT controllers, wavelength MUXs, optical splitters, and ONUs are shown in FIG. 1 as being separate hardware components, it is possible in some embodiments for one or more of these components to be implemented in hardware, software, or firmware, of any combination thereof. For example, in an alternate embodiment, one of more components of PON 100 may share hardware resources, and be variously implemented as a combination of hardware and software.

When an ONU 30-37 receives a downstream optical signal through the corresponding one of optical fibers 50-57, the ONU is configured to convert the signal from the optical domain back to the electrical domain. The ONUs 30-37 may de-encapsulate the data to strip away the overhead of the optical protocol of the PON 100 before transmitting the data further downstream. In one embodiment, each ONU 30 resides at and serves a single respective customer premises. In other embodiments, any of the ONUs 30-37 may serve multiple customer premises by transmitting data downstream to one or more customer premises transceivers (not shown) at one or more customer premises.

In the upstream direction, each of the ONUs 30-37 receives an electrical signal carrying data to be communicated through the PON 100 and converts the signal from the electrical domain to the optical domain. In this regard, the ONU is configured to encapsulate the data in accordance with a known optical protocol, such as NG-PON2, and to communicate the data via an optical signal, through one of optical fibers 50-57, and eventually, through the optical fiber 20 to the OLT channel termination that is servicing the ONU.

As described above with regard to downstream communication, each ONU 30-37 is assigned to a particular channel termination 15-18, which communicates with the ONU via a control channel in order to allocate time slots to the ONU. An ONU that is communicating with a channel termination is configured to transmit upstream at a particular wavelength known and controlled by the channel termination. In this regard, each channel termination 15-18 is associated with a wavelength pair: one wavelength for downstream communication and another wavelength for upstream communication. Upstream communications for an OLT are time-division multiplexed (as controlled by the OLT according to a desired algorithm), so as to be permitted to transmit data in a unique time slot, in order to prevent upstream data collisions.

Figure 2A:
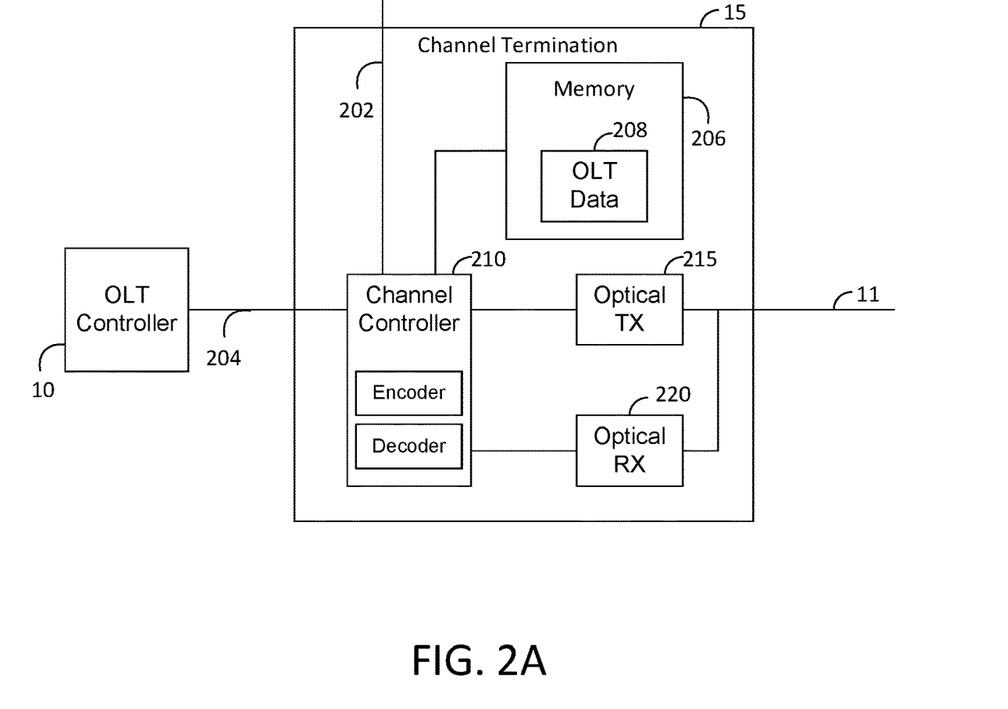
FIG. 2A is a block diagram illustrating an exemplary embodiment of a channel termination of an optical line terminal (OLT).

For illustrative purposes, the configuration and operation of an exemplary channel termination 15 will be described in more detail hereafter in the context of FIG. 2A. It is to be understood that the channel terminations 15-18 may be similarly configured and operated. As shown in FIG. 2A, a channel termination 15 may receive data from network access device 12 via a connection 202, or may communicate with OLT controller 10 via connection 204. Note that connections 202 and 204 (as well as any other connections in PON 100) may be physical connections, such as conductive wires or an optical fiber, or wireless connections. In an alternate embodiment, in which a channel termination 15 shares hardware with network access device 12 and/or other components of OLT 13, use of a separate physical or wireless connection may be unnecessary.

As shown by FIG. 2A, a channel termination 15 has a memory 206 storing data 208, referred to herein as "OLT data," that can be accessed and used by a channel controller 210 during operation. The channel controller 210 can be implemented in hardware, software, firmware, or any combination thereof. In one example, the controller 210 may include one or more application specific integrated circuits (ASICs), field-programmable gate arrays (FPGAs), processors (e.g., microprocessors) programmed with software or firmware, and/or other types of circuitry for performing the functionality or tasks described herein for the controller 210. In one embodiment, the controller 210 may include circuitry comprising a decoder configured to recognize errors in upstream transmissions from the ONUs. The controller 210 may also include circuitry comprising an encoder configured to add parity bits to downstream transmissions, to allow the receiving ONUs to recognize errors in downstream transmission. In another embodiment, the encoder and/or the decoder may be a hardware component separate from the controller 210, and may report errors to the controller 210.

In one embodiment, the channel controller 210 encapsulates data into packets in accordance with an optical protocol of the PON 100. A portion of the packet is the payload and a portion is the header, which includes control information that allows for downstream transmission of the packet from the channel termination to an ONU and transmission of the data to the customer premises. The channel controller 210 may use OLT data 208 to define control data for transmission of the encapsulated packets. For example, the OLT data 208 may define a list of network identifiers identifying ONUs that are currently assigned to the channel termination 15 for communication. For such ONUs, the channel controller 210 may be configured to allocate time slots for upstream communication and transmit control data via a control channel embedded in an optical protocol of the PON 100 to inform each ONU of which time slots are allocated to it.

The channel termination 15 also has an optical transmitter (TX) 215 and an optical receiver (RX) 220 that are optically coupled to the optical fiber 11. The optical transmitter 215 has at least one optical component, such as a laser, for transmitting optical signals through the fiber 11 to the ONUs 30-17. The optical receiver 220 has at least one optical component, such as a photodiode, for receiving optical signals from the fiber 11. In alternate embodiments, other types of optical transmitters and receivers may be used. The channel controller 210 controls the transmission of data packets downstream via optical transmitter 215 and upstream via optical receiver 220 in accordance with the defined optical protocol.

Figure 2B:
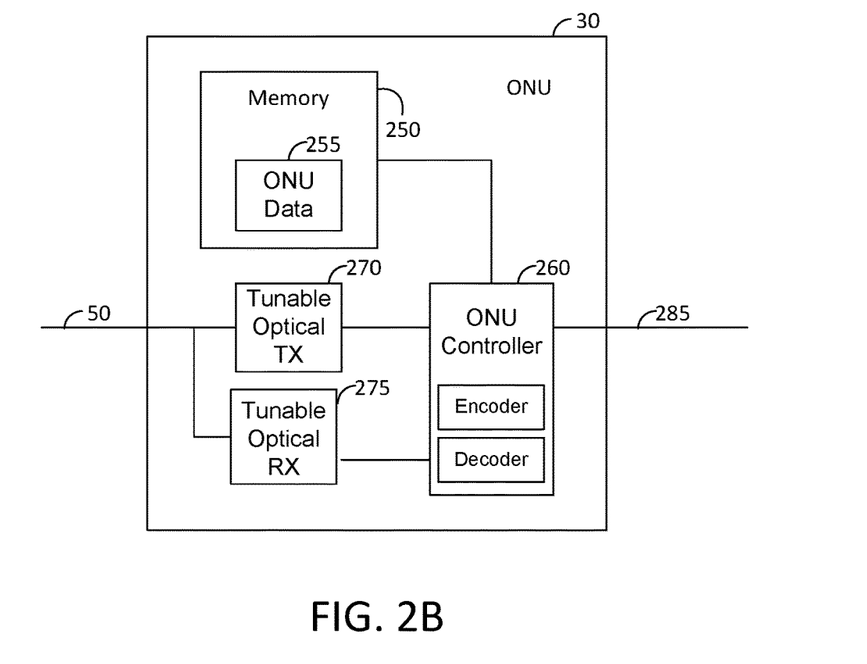
FIG. 2B is a block diagram illustrating an exemplary embodiment of an optical network unit (ONU).

FIG. 2B illustrates an ONU in accordance with an exemplary embodiment. For illustrative purposes, the configuration and operation of the ONU 30 will be described in more detail hereafter in the context of FIG. 2B, however, it is to be understood that the ONUs 31-37 may be similarly configured and operated. Further, while communication is described between ONU 30 and channel termination 15, it will be understood that ONU 30 can communicate with any of the channel terminations 15-18, in accordance with its assignment.

As shown by FIG. 2B, the ONU 30 has a memory 250 storing data 255, referred to herein as "ONU data," that can be accessed and used by an ONU controller 260 during operation. The ONU controller 260 can be implemented in hardware, software, firmware, or any combination thereof. In one embodiment, the controller 260 may include one or more application specific integrated circuits (ASICs), field-programmable gate arrays (FPGAs), processors (e.g., microprocessors) programmed with software or firmware, and/or other types of circuitry for performing the functionality or tasks described herein for the controller 260. In one embodiment, the controller 260 may include circuitry comprising an encoder configured to encode data and add parity bits to transmissions, to allow for the channel termination 15 to recognize errors in upstream transmissions from ONU 30. Additionally, the controller 260 may include circuitry comprising a decoder, capable of recognizing errors in downstream transmission from the channel termination 15. In another embodiment, the encoder and/or the decoder may be implemented as circuitry separate from the controller 260.

The ONU 30 is also equipped with a tunable optical transmitter (TX) 270 and a tunable optical receiver (RX) 275. The tunable optical transmitter 270 has at least one optical component, such as a laser, for transmitting an optical signal through the fiber 50 to a channel termination 15, and a control element for controlling the laser, including for example, its wavelength and/or transmission power. The tunable optical receiver 275 has at least one optical component, such as a photodiode, for receiving an optical signal from the fiber 50, as well as a control element for controlling, for example, the wavelength detected by the photodiode and/or the receive sensitivity of the photodiode. As an example, the control element of the tunable optical receiver 275 may tune to receive an optical signal at the wavelength associated with downstream communications from the channel termination 15.

In one embodiment, the control elements of the optical transmitter 270 and the optical receiver 275 may be implemented by circuitry, in accordance with an algorithm stored in memory 250, however, in alternate embodiments, this may be done by a processor that is part of or separate to controller 260, other circuitry or software, or any combination thereof. Further, the ONU data 255 may indicate communication characteristics for enabling communication between the ONU 30 and the channel termination 15. Specifically, the ONU data 255 may indicate the wavelength, transmit power, and/or other information for controlling the tunable optical transmitter 270 to transmit upstream signals to the channel termination 15, and may also indicate the wavelength, receive sensitivity, and/or other information for controlling the tunable optical receiver 275 to receive downstream signals.

The tunable optical transmitter 270 is tunable to any of the four upstream wavelengths and the tunable optical receiver 275 is tunable to any of the four downstream wavelengths. An ONU is able to tune to any channel upon instructions from the channel termination 15. In the exemplary embodiment, the optical receiver 275 is configured to tune its wavelength to any of the downstream wavelengths set in accordance with the commands of the channel termination 15, and the optical transmitter 270 can tune its wavelength to any of the upstream wavelengths. By variously tuning the optical transmitter 270 and the optical receiver 275, an ONU can be "moved" to a different wavelength pair (i.e., one wavelength for upstream and another wavelength for downstream).

In the downstream direction, the ONU controller 260 may be configured to receive a stream of data from the tunable optical receiver 275, de-encapsulate the data to strip away overhead associated with the optical protocol of the PON 100, and transmit the data further downstream (e.g., toward customer premises equipment at one or more customer premises).

In an upstream direction, the ONU controller 260 may be configured to receive a stream of data from communication line 285 which connects to the ONU 30 (e.g., from one or more customer premises equipment at one or more customer premises customer premises). The ONU controller 260 performs encoding of the received signal, including adding parity information to allow the channel termination 15 to determine if there are any errors. The control elements of the optical transmitter 270 and the optical receiver 275, having been previously informed of the appropriate wavelength and timeslot at which the ONU 30 should transmit upstream (through control data sent by the channel termination 15 to the ONU controller 260), monitors the performances of the transmitter and receiver (through, for example, a feedback loop) and adjusts them as necessary to conform to the designated values. The ONU controller 260 also encapsulates the data stream in accordance with the optical protocol of the PON 100, as set by the channel termination 15, and provides the data stream to the tunable optical transmitter 270 for transmission to the channel termination 15.

During normal operation, the ONU 30 communicates with channel termination 15 in the manner described above. During such operation, the tunable optical transmitter 270 and tunable optical receiver 275 of the ONU 31 are tuned to a respective wavelength of the wavelength pair associated with the channel termination 15, and the ONU controller 260 manages upstream transmission to the channel termination 15 in the allocated timeslots.

An ONU 30 that transmits signals across the PON 100 during a timeslot that has not been allocated to it is referred to herein as a "rogue ONU." These "rogue" transmissions cause errors on the PON 100 and, in some cases, bring down the PON entirely. When the ONU 30 is exhibiting rogue behavior, the channel termination 15 is configured to detect ONU 30 as the rogue ONU of plurality of ONUs and to control the operation of the remaining ONUs in order to optically isolate rogue ONU 30 from the rest of the PON 100, as will be discussed in more detail hereafter.

Figure 3:
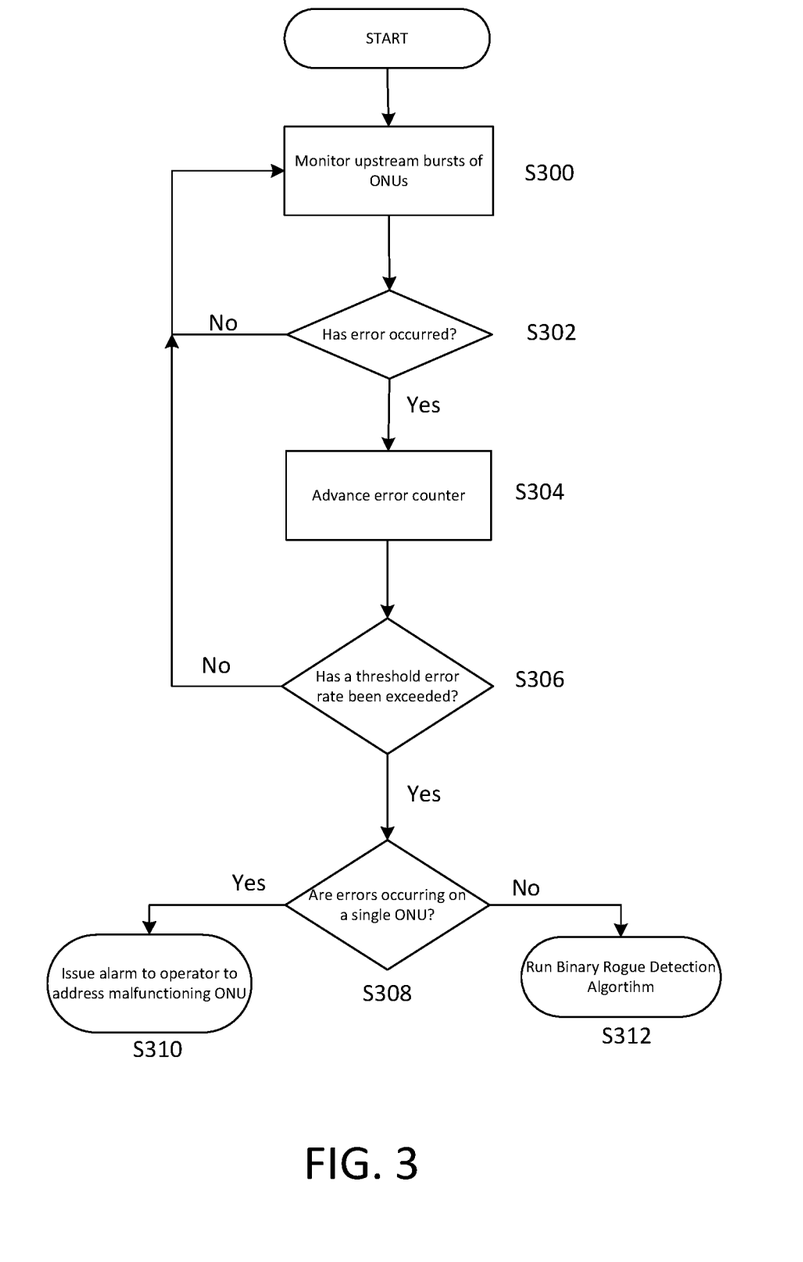
FIG. 3 is a flowchart illustrating an exemplary method for detecting rogue transmissions in accordance with the present disclosure.

FIG. 3 depicts one example of a technique that can be used to detect the occurrence of rogue behavior over a PON 100, in accordance with one embodiment of the invention. In the process illustrated by FIG. 3, the channel controller 210 of the channel termination 15 (for example, through a decoder in the channel controller 210) maintains and manages one or more individual ONU error counters tracking a number of errors occurring from the ONU and/or the rate of occurrence of those errors in a given time period. Alternatively, the channel controller 210 may also track the total number of errors occurring over the channel, and/or their rate of occurrence. The OLT controller 10, collecting the error data from each of the channel terminations 15-18, maintains and manages a global error counter, i.e. a counter tracking a total number of errors occurring over the entire PON, and/or the rate of those errors over a given time period. In one embodiment, the individual ONU error counter may be stored in the memory 206 of a channel termination 15. The global error counter may be stored, for example, in a memory (not shown) of the OLT controller 10.

In Step S300 of FIG. 3, each channel controller 210 monitors the upstream optical bursts received from the ONUs 30-37 (FIG. 1) associated with its respective channel controller to ensure that the data from the ONUs is properly time-division multiplexed and that an excessive number of errors are not occurring over that channel. A channel controller 210 may monitor for several different types of errors. For example, the channel termination 15 may recognize that a transmission has occurred by an ONU outside of its designated timeslot. In another example, the channel termination 15 may recognize errors in which an upstream communication from an ONU at a particular timeslot contains no data, or in which some bits of the data packet are incorrect (e.g., by a cyclic redundancy check (CRC) of the sent data, or the like). In an alternate embodiment, any known or developed error-detection system may be used.

If the channel controller 210 detects an upstream error (Step S302), the channel controller 210 increments the individual ONU error counter, advancing it by one for each detected error (Step S304). The channel controller 210 then continues to monitor the PON 100. The OLT controller 13, communicating with each of the channel terminations 15-18 to determine the value of their individual ONU error counters, would increment the global error counter in turn, to reflect this increase.

In block S306 of FIG. 3, the OLT controller 10 determines if the global error count, considered over a given time period, has exceeded a predetermined threshold. If so, the OLT controller 10 concludes that one of the ONUs 30-37 may be rogue or malfunctioning. In such a circumstance, the OLT controller 10 looks to the individual ONU error counters, to determine whether a significant amount of errors were localized to a single ONU. In one embodiment, if a significant (e.g., excessive) number of errors occurred in transmission from a single ONU, the OLT controller 10 may identify the source of the errors as a misbehaving ONU (Step S310). The OLT controller 10 may then, in Step S310, issue an alarm to an operator of the PON 100. The operator could then take steps to repair the ONU as needed, for example by dispatching a technician to the misbehaving ONU. In a scenario where rogue behavior is identified (e.g., there is a large number of errors occurring over several ONUs suggesting interference between ONUs), the OLT controller 10 must take further steps to identify the rogue ONU causing the errors. One exemplary algorithm, a Binary Rogue Detection Algorithm (Step S312) will be described in more detail below with reference to FIG. 4.

As the error rate is determined by a number of errors occurring over a set period of time, the global and/or local error counts may be reset or decremented after that set time period has passed, so as to provide an accurate error rate. In such a scenario, the resetting or decrementing of the global error count may be performed by OLT controller 10, and the resetting or decrementing of the individual ONU error counts may be performed by each respective channel controller 210.

It will be noted that, in an alternate embodiment, the OLTs 15-18 may use techniques other than global/individual error counters to detect the presence of a rogue ONU over the PON. For example, in one embodiment the ONU may employ a watchdog circuit. In an alternative embodiment, the PON may use circuitry along the fiber itself to determine whether an ONU has been sending rogue transmission.

In an alternate embodiment, the PON is configured to operate in a manner similar to that shown in FIG. 3, except the Binary Rogue Detection Algorithm is performed regardless of whether significant errors are determined to have occurred over multiple ONUs. In other words, in the alternative embodiment, Step S308 of FIG. 3 is not performed, and the process proceeds directly from Step S306 to Step S312.

Figure 4:
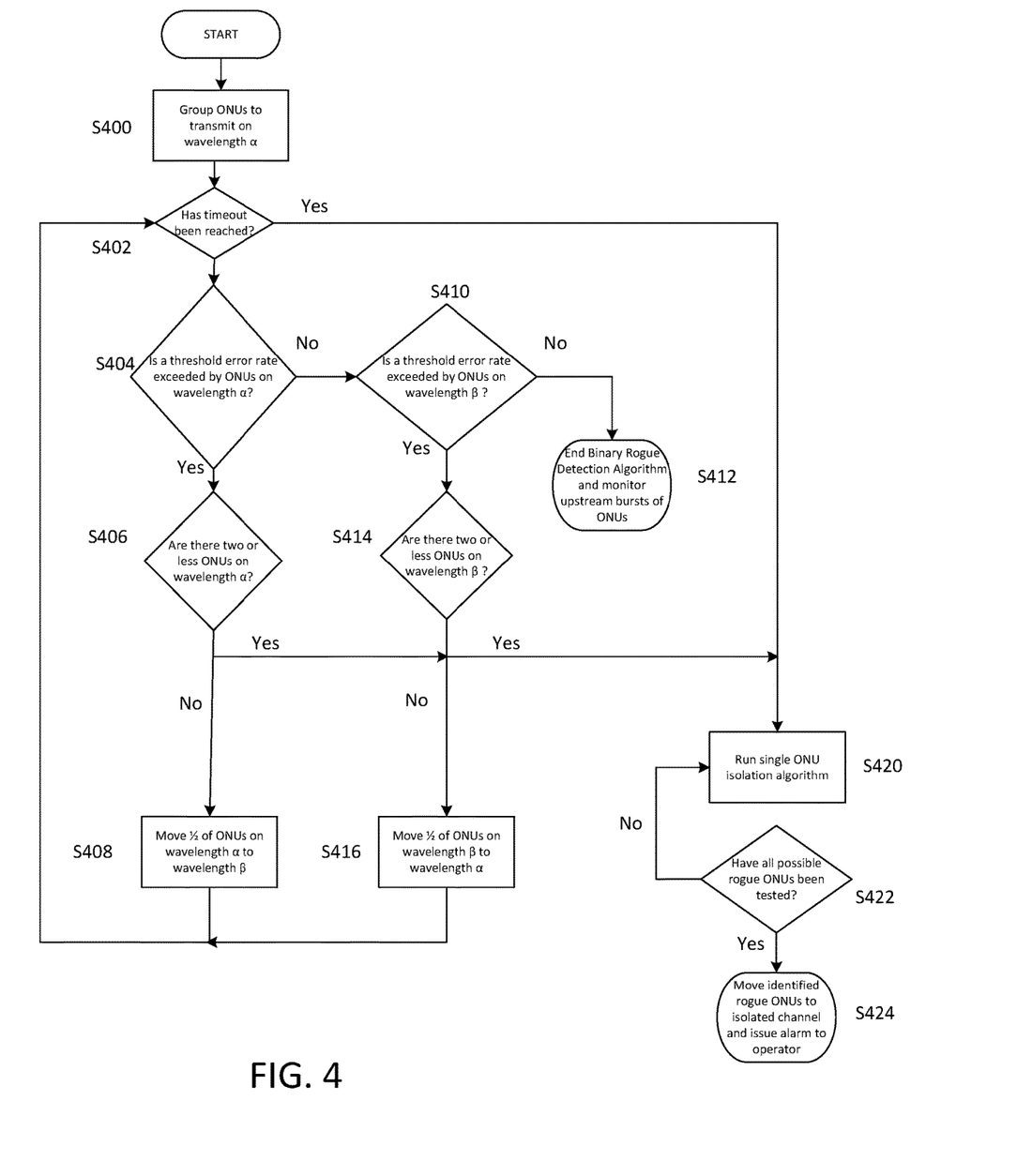
FIG. 4 is a flowchart illustrating an exemplary method for performing a rogue detection algorithm in accordance with the present disclosure.

FIG. 4 illustrates a process for discovering which of a plurality of ONUs is rogue, once the presence of rogue behavior is detected, a process referred to herein as the Binary Rogue Detection Algorithm. This algorithm is used, in an exemplary embodiment, in a scenario where errors, if any, on the downstream channel from the OLTs 15-18 to the ONUs 30-37 would not make downstream transmission impossible or impractical, and therefore, the ONUs 30-37 (either including or excluding the rogue ONU) are able to receive control communications from the OLT 13. In the exemplary embodiment, all of the steps of the Binary Rogue Detection Algorithm are performed by the OLT controller 10, through control of the channel terminations 15-18, however, in an alternate embodiment, other networked components upstream from the ONUs 30-37 may perform one or more of the steps described below.

In the exemplary embodiment of FIG. 4, at the starting point of the Binary Rogue Detection Algorithm, illustrated in Step S400, the OLT controller 10 instructs channel terminations 15-18 to control all of the ONUs 30-37 as one group collectively transmitting on a first wavelength α of a "primary channel," if the ONUs 30-37 are not already communicating on the primary channel. However, in alternate embodiments, the ONUs may not be so grouped, and instead only a subset of ONUs 30-37 may be controlled so as to transmit on the primary channel with the remaining ONUs communicating on one or more other channels. The upstream communication of the ONUs transmitting on this primary channel of the termination 15 (at this point, in the exemplary embodiment, all ONUs) is monitored for errors by channel controller 210 in the manner described above with regard to FIG. 3. In one embodiment, the channel controller 210 performs this monitoring of the upstream data channel for a predefined amount of time, however, the channel controller 210 may be configured to continuously perform such monitoring during normal operation.

In Step S402, the OLT controller 10 determines whether a period of time set for completion of the Binary Rogue Detection Algorithm has been reached, i.e., whether a "timeout" has occurred. This timeout may be set in the OLT 10 by the systems administrator or defined in another manner. If a timeout point has been reached, the process jumps to Step S420, described below. It will be understood that for the first few iterations of the algorithm, such timeout is unlikely to have occurred.

If a timeout point has not been reached, the OLT controller 10 determines, at Step S404, whether a significant (e.g., excessive) rate of error is occurring in the primary channel transmitting on wavelength α, for example, through determination of whether a threshold error rate in a set time period has been exceeded. In other alternate embodiments, the process may use a threshold error count rather than a threshold error rate. If a significant rate of error exists in the primary channel, it is apparent that the rogue ONU is broadcasting on that primary channel. It will be understood that in the first iteration of the Binary Rogue Detection Algorithm of the exemplary embodiment, because all ONUs were initially instructed to be on the primary channel, it will be likely that significant errors will be determined to exist in the primary channel, and the process will continue to Step S406. However, in a case where no significant rate of error is detected on the primary channel (transmitting on wavelength α), the process continues in Step S410 to monitor for errors on a secondary channel (transmitting on wavelength β, as described further below). It will be understood that as no ONUs are transmitting on wavelength β in the first iteration of the exemplary embodiment of the algorithm, no errors will be found, and the algorithm will end at Step S412, with the OLT controller 10 going back to its normal function, and, if necessary, directing the channel controllers 210 to return to their normal function.

If errors are determined to have occurred from the ONUs on the primary channel (wavelength α), the OLT controller 10, in Step S406, determines whether there are two or fewer ONUs on the primary channel. If there are two or fewer ONUs, the process proceeds to Step S420, which is described in further detail below. If there are more than two ONUs transmitting on the primary channel, the OLT controller 10, in Step S408, groups the ONUs into two groups, where one group of the ONUs is on the primary channel broadcasting on wavelength α, and a second group of the ONUs is on a secondary channel broadcasting on wavelength β for another channel termination, such as channel termination 16. In particular, the OLT controller 10 identifies a subset of ONUs broadcasting on wavelength α and then requests the channel terminations 15 and 16 to control the ONUs in that subset to tune to wavelength β (of "the secondary channel"). To do this, for each of the identified subset of ONUs that it would like to "move," the OLT controller 10 sends control data to the channel termination 15 associated with the primary channel, instructing the channel termination 15 to contact the ONU controller 260 of each of the subset of ONUs in the identified subset so as to control the ONU's respective tunable optical transmitter 270 and tunable optical receiver 275 to listen and transmit on the wavelength pair for the secondary channel. The OLT controller 10 also sends control data to a channel termination 16 associated with the secondary channel, instructing the channel termination 16 to assign timeslots to the "moved" ONUs to allow for them to transmit on the upstream wavelength β of the wavelength pair for termination 16.

Figure 5:
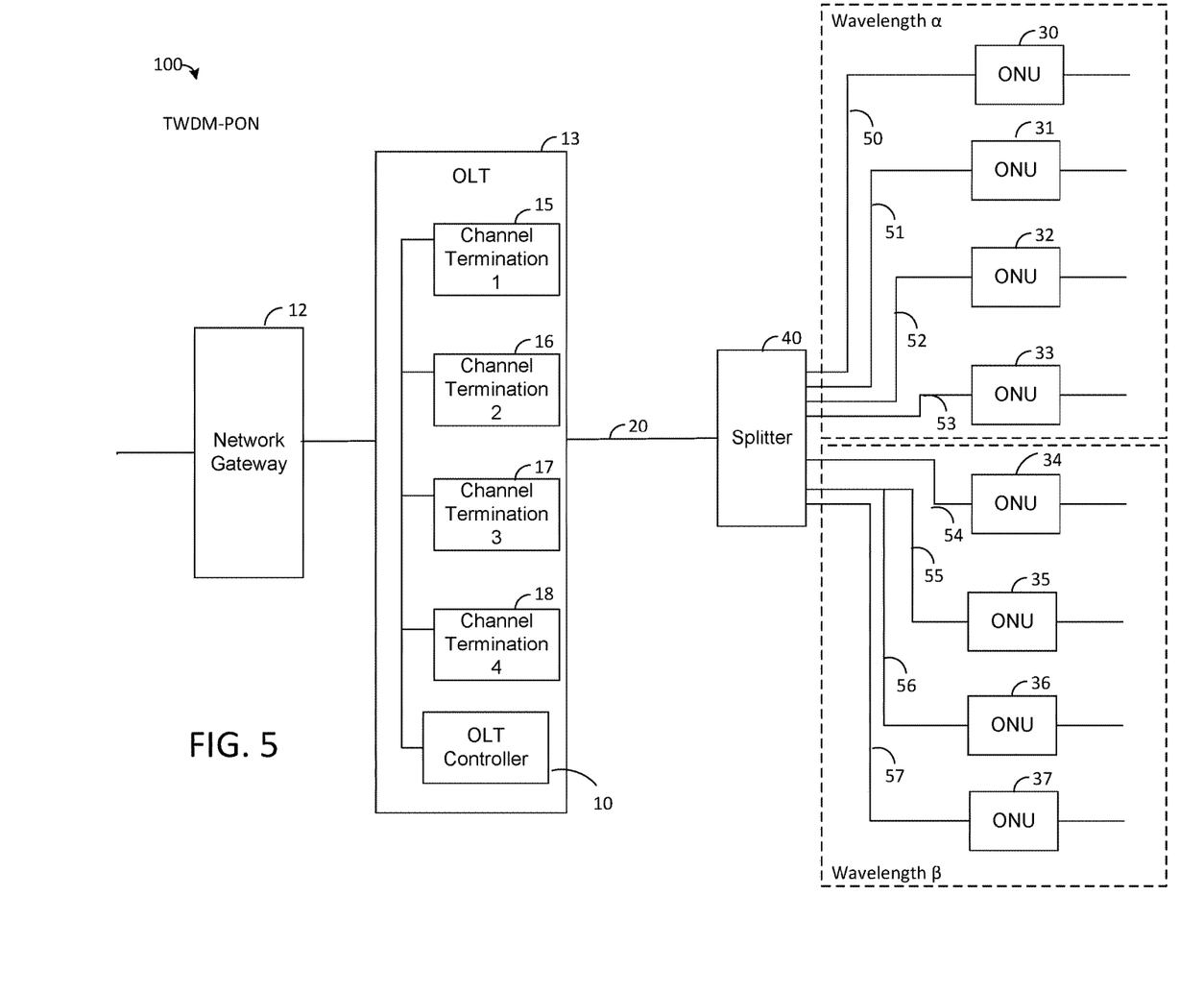
FIGS. 5 and 6 are block diagrams illustrating an exemplary passive optical network in the process of performing a rogue detection algorithm in accordance with the present disclosure.

In an exemplary embodiment, the subset of ONUs instructed to be tuned to wavelength β is ½ of the ONUs transmitting on wavelength α. FIG. 5 illustrates this exemplary grouping of ONUs, with dashed lines delineating the ONUs transmitting on wavelength α from those transmitting on wavelength β. It will be noted that, for simplicity of illustration, MUX 25 (FIG. 1) has been omitted from the depiction of FIG. 5. The channel termination 15 may use any consistent method to select this subset of the ONUs, for example, the first ½ of the ONUs when sorted by device name, MAC address, or any other ordering maintained by the network administration. In addition, the OLT controller 10 is not limited to moving ½ of the ONUs, and instead may control any size subset of the ONUs at one time. For example, in a PON where there are relatively few ONUs, the OLT controller 10 may cause only one or a few ONUs to switch to the other channel. Alternatively, in a PON where the OLT controller 10 suspects that one or more particular ONUs is the rogue ONU (or, conversely, has already confirmed that one or more particular ONUs are not rogue), the channel termination 15 may strategically switch more or less than ½ of the ONUs to more quickly isolate the suspected rogue ONUs. The OLT controller 10 may also cause ONUs to switch between the channels in both directions, i.e., moving a subset of ONUs from wavelength α to wavelength β while at the same time moving a subset of ONUs from wavelength β to wavelength α, in order to more quickly isolate suspected rogue ONUs.

After the subset of ONUs has been tuned to wavelength β, the process of FIG. 4 loops back to S402 in an iterative manner. As described above, in step S402, if no timeout for the algorithm has been reached, the process continues to block S404, where the channel controller 210 monitors upstream traffic of the ONUs on the primary channel to determine whether a significant rate of error is occurring on wavelength α. At this point, one of two scenarios may have occurred: either the as of yet unknown rogue ONU is still transmitting on the primary channel (either because it was not in the subset of ONUs moved to the secondary channel, or because it, due to error, did not receive control data from an OLT and/or move as instructed by the OLT), or the unknown rogue ONU is transmitting on the secondary channel. The OLT controller 10, via channel controllers 210 of channel terminations 15 and 16, therefore monitors the error rate of both channels in turn, in Steps S404 and S410.

If a significant error rate is found on the primary channel, the algorithm proceeds once again to step S406 to determine whether two or fewer ONUs are transmitting on wavelength α. If not (i.e., more than two are transmitting), the channel termination 15 once again moves a subset of ONUs from the primary channel to the secondary channel, and the process loops once more to block S402. If two or fewer ONUs are on the primary channel, the process proceeds to S420.

If no significant error rate is detected in the primary channel (block S404), then the OLT controller 10, in Step S410, monitors the upstream transmission of the ONUs that had been earlier moved to the secondary channel, to determine whether a significant rate of error is occurring on the ONUs transmitting on wavelength β. It will be noted that, if no significant error rate was detected in the primary channel, each of the ONUs transmitting on the primary channel is confirmed not to be rogue. This confirmation may be used in subsequent iterations of the algorithm, to exclude the confirmed ONUs from the list of suspected rogue ONUs.

If no excessive error rate is observed in the secondary channel (i.e., each ONU transmitting on the secondary channel is confirmed not to be rogue), then the Binary Rogue Detection Algorithm ends, as depicted in S412, and the OLT controller 10 goes back to its normal function and instructions channel controllers 210 to resume normal function, is necessary. If however, an excessive error rate is detected on the secondary channel, it is apparent that the rogue ONU has moved to the secondary channel in accordance with the instruction by the OLT controller 10. The OLT controller 10 then performs the converse of it is earlier actions—if it is determined in Step S414 that there are two or fewer ONUs on the secondary channel, the process proceeds to step S420. If it is determined in Step S414 that more than two ONUs are on the secondary channel, the OLT controller 10, in Step S416, controls a subset of ONUs transmitting on the second channel to tune back from wavelength β to wavelength α (block S404).

Figure 6:
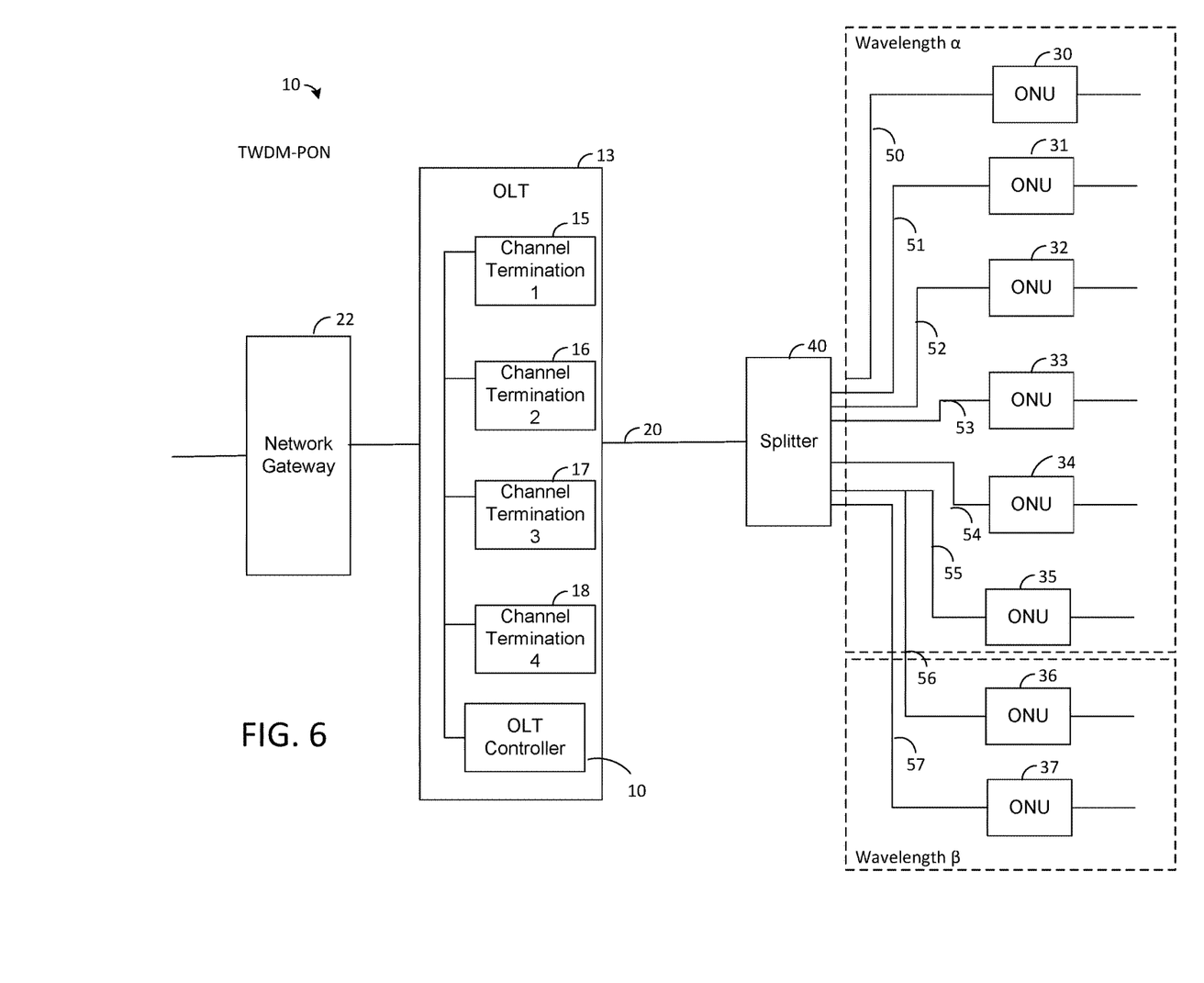

In an exemplary embodiment, the subset of ONUs instructed to be tuned from wavelength β back to wavelength α includes/omits ONUs previously determined not to be rogue, while omitting/including the ONUs "newly" moved to the secondary channel, or a subset thereof. In other words, the OLT controller 10 attempts to separate suspected rogue ONUs from ONUs confirmed to be well-behaving. This delineation may depend on which channel the OLT controller 10 intends to use to isolate the rogue ONU. FIG. 6 illustrates an exemplary grouping of ONUs, with dashed lines delineating the ONUs transmitting on wavelength α from those transmitting on wavelength β. It will be noted that for simplicity of illustration, MUX 25 (FIG. 1) has been omitted from the depiction of FIG. 6. In alternate embodiments, any number of ONUs can be moved (e.g., ½ of the ONUs transmitting on wavelength β), ONUs may be moved bi-directionally, and any method of selecting ONUs may be used, as described above with respect to Step S408. The process of FIG. 4 then loops back to S402 in an iterative manner.

If, during any iteration of the algorithm, it is determined that a significant error rate is occurring in a group of two or fewer ONUs (Step S406) or if a timeout has been reached (Step S402), the algorithm proceeds to the Step S420, in which a Single ONU Isolation Algorithm is run. During the Single ONU Isolation Algorithm, each possible rogue ONU (that is, each ONU transmitting on a channel on which a significant rate of error is detected) is individually moved to another channel with other ONUs (either transmitting on wavelength α, β, or another wavelength) on which an excessive error rate is not being detected. That new channel is then monitored for errors, e.g., to see if transmission interference now occurs between the ONUs. If an excessive error rate is detected on the new channel, the individual ONU moved to the new channel is understood to have introduced the errors. Conversely, if no excessive error rate is detected on the new channel, the channel termination 15 concludes that the individual ONU that was moved is not a rogue ONU and moves the individual ONU back to its previous channel. The remaining possible rogue ONU is then individually moved to the error-free channel, and the process is repeated for this remaining possible rogue ONU to determine whether it is rogue. In another embodiment, instead of moving each possible rogue ONU to a channel with other ONUs, the individual ONU is moved onto a new channel on which no other ONUs are transmitting, and the new channel is monitored to determine if the ONU is transmitting outside of its allocated timeslots to determine if it is rogue.

In Step S422, the OLT controller 10 determines whether every possible rogue ONU has been isolated onto a new channel and monitored. If not every ONU has been isolated, the process returns to block S420 and a different ONU is isolated. If every possible rogue ONU has been isolated, then the OLT controller 10 determines that any individual ONU that created errors on the new channel is a rogue ONU.

In step S424, the rogue ONU (or more than one, if found) is moved to its own isolated channel, separate from any other ONU, and the remaining, error-free ONUs are switched back to their appropriate channel, whether that is the primary channel or any other channel through which the rogue ONU is not transmitting. The OLT controller 10 may then issue an alarm to an operator of the PON 100 identifying the rogue ONU. The operator could then take steps to repair the rogue ONU as needed, for example by dispatching a technician to the rogue ONU. The OLT controller 10 then returns to its normal operation and instructs the channel controllers 210 to return to normal operation, if necessary.

In this manner, troubleshooting can be performed, and each ONU can be individually tested for error, even while all ONUs remain operational. Any delay that results from switching between wavelengths is approximately 50 ms or less, a delay much shorter than the delay of shutting down an ONU, and does not noticeably impact transmission of data to the customer premises. As a result, ONU uptime is maximized and service disruption to the customer is minimized.

Figure 7A:
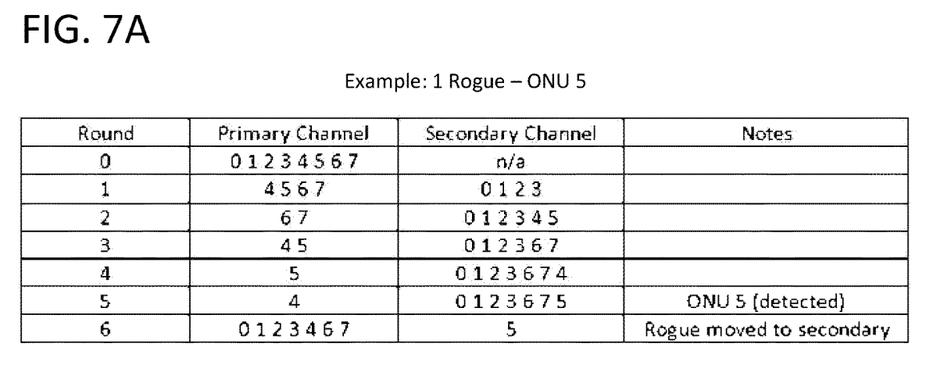
FIGS. 7A and 7B are tables illustrating exemplary applications of the binary rogue detection algorithm in accordance with the present disclosure.
Figure 7B:
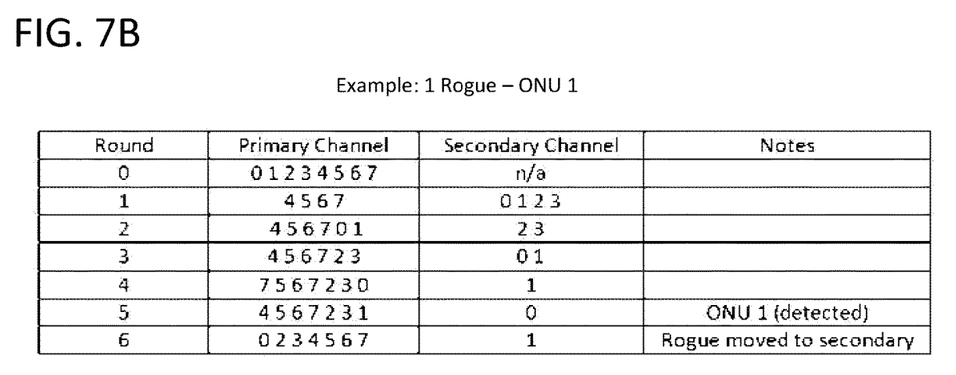

Various implementations of a process for detection of a rogue ONU are depicted in FIGS. 7A and 7B. In FIGS. 7A and 7B, a PON 100 includes eight ONUs respectively numbered as 0-7. FIG. 7A illustrates an embodiment in which the rogue ONU is ONU 5. The process begins by tuning all of ONUs 1-7 to a primary channel. During the first two iterations of the algorithm (Rounds 0-1), a high error rate is detected on the primary channel, and in response, ½ of the ONUs are moved from the primary channel to the secondary channel. In Round 2, a high error rate is not detected on the primary channel and a high error rate is detected on the secondary channel. The OLT, recognizing (from Round 1) that none of ONUs 0, 1, 2, and 3 created errors, and recognizing (from Round 2) that neither of ONUs 6 and 7 created errors, identifies ONUs 4 and 5 as possible rogue ONUs. In response, the OLT strategically moves ONUs 6 and 7 to the secondary channel and moves suspected rogue ONUs 4 and 5 to the primary channel for Round 3, during which a high error rate is detected on the primary channel, thereby confirming that ONU 4 or 5 is responsible for the rogue behavior. The process then, in Rounds 4 and 5, performs the Single ONU Isolation Algorithm, individually isolating ONUs 4 and 5 and eventually detecting ONU 5 as the rogue ONU. In Round 6, ONU 5 is isolated in the secondary channel and ONUs 1-4, 6, and 7 are moved to the primary channel. FIG. 7B illustrates an embodiment in which the rogue ONU is ONU 1. The process begins by tuning all of ONUs 1-7 to a primary channel. During Rounds 1-3, a high rate error rate is detected on the secondary, primary, and secondary channels respectively, as ONU 1 is switched to those channels. In Rounds 4 and 5, the Single ONU Isolation Algorithm is performed, individually isolating ONUs 0 and 1 and eventually detecting ONU 1 as the rogue ONU. In Round 6, ONU 1 is isolated in the secondary channel and ONUs 0 and 2-7 are moved to the primary channel.

In an alternate embodiment, the OLT controller 10 is configured to operate as in the exemplary process illustrated in FIG. 4, except that if at any point during the Binary Rogue Detection Algorithm, the OLT controller 10 is able to recognize that a particular ONU does not move to a new channel after being instructed to do so, the OLT controller 10 identifies that ONU as the rogue ONU and proceeds to isolate that ONU by instructing the appropriate channel termination 15-18 to tune all the remaining ONUs to the wavelength(s) that the rogue ONU is not tuned to, thereby ending the cycle of the Binary Rogue Detection Algorithm. The OLT controller 10 then issues an alarm to the operator and proceeds with its normal operation.

In the exemplary embodiment and the above-discussed alternative embodiment, the channel controller 210 and optical receiver 220 of the channel terminations associated with the primary and secondary channels may be configured to recognize that an ONU has not moved to the secondary channel by monitoring the upstream bursts on those channels. Each packet sent upstream by an ONU includes an ONU ID, by which a channel termination 15 can determine the source of the transmitted data. The channel termination can determine that an ONU has not tuned to the instructed channel by either recognizing that it has not received transmissions with the ONU's ID on the "new" channel, or by recognizing that it is still receiving transmissions with the ONU's ID on the "old channel." Through this, troubleshooting of the PON 100 can be performed and an individual rogue ONU can be identified, even where the rogue ONU is wholly unresponsive to the OLT 13 and would not follow an instruction from a channel termination to deactivate.

This disclosure may be provided in other specific forms and embodiments without departing from the essential characteristics as described herein. The embodiments described are to be considered in all aspects as illustrative only and not restrictive in any manner.

The following are claimed:

1. An optical line terminal (OLT) coupled to an optical fiber of an optical network, the OLT comprising:
   an optical transmitter; and
   an optical receiver,
   wherein the OLT is configured to:
   (a) receive data via a first wavelength from a first plurality of optical network units (ONUs) coupled to the optical fiber and a second plurality of ONUs coupled to the optical fiber,
   (b) transmit data to each of the first plurality of ONUs and each of the second plurality of ONUs,
   (c) in response to a detection of rogue ONU behavior associated with the first wavelength, request each of the second plurality of ONUs to switch from transmission of data on the first wavelength through the optical fiber to transmission of data on a second wavelength through the optical fiber while each of the first plurality of ONUs is controlled by the OLT to continue transmitting data on the first wavelength through the optical fiber,
   (d) determine whether the first plurality of ONUs transmitting on the first wavelength are exhibiting rogue behavior,
   (e) determine whether the second plurality of ONUS transmitting on the second wavelength are exhibiting rogue behavior,
   (f) if the first plurality of ONUs are determined not to be exhibiting rogue behavior, confirm that each of the first plurality of ONUs is not rogue,
   (g) if the second plurality of ONUs are determined not to be exhibiting rogue behavior, confirm that each of the second plurality of ONUs is not rogue,
   (h) based on which of the first plurality of ONUs and the second plurality of ONUs have been confirmed not to be rogue, select a subset of the first plurality of ONUs or the second plurality of ONUs to move between the first wavelength and the second wavelength,
   (i) request each of the selected subset of ONUs to switch transmission of data on one of the first wavelength and the second wavelength to transmission of data on the other of the first wavelength and the second wavelength,
   (j) confirm that at least one of the first plurality of ONUs and the second plurality of ONUs is not rogue,
   (k) repeat steps (h) select, (i) request, and (j) confirm until one of the first plurality of ONUs and the second plurality of ONUs is identified by the OLT to be rogue, and
   (l) based on which of the first plurality of ONUs and the second plurality of ONUs is identified by the OLT as rogue, control the first plurality of ONUs and the second plurality of ONUs such that the ONU identified as rogue is prevented from interfering with transmissions by each of the first plurality of ONUs and the second plurality of ONUs confirmed not to be rogue.

2. The optical line terminal of claim 1, wherein the OLT is configured to determine an error rate occurring on the optical network and to make the detection of the rogue ONU behavior based on the error rate.

3. The optical line terminal of claim 1, wherein a number of the first plurality of ONUs is substantially equal to a number of the second plurality of ONUs.

4. The optical line terminal of claim 1, wherein the OLT is configured to control, based on which of the first plurality of ONUs and the second plurality of ONUs is identified by the OLT as rogue, the first plurality of ONUs and the second plurality of ONUs such that a transmission wavelength of the ONU identified as rogue is isolated from a transmission wavelength of each of the first plurality of ONUs and the second plurality of ONUs confirmed not to be rogue.

5. An optical network, comprising:
   an optical fiber;
   an optical line terminal (OLT) coupled to the optical fiber, the OLT being configured to transmit via any of a plurality of wavelengths and receive communication via any of the plurality of wavelengths;

a first plurality of optical network units (ONUs) coupled to the optical fiber; and
a second plurality of ONUs coupled to the optical fiber, wherein each of the first plurality of ONUs and the second plurality of ONUs comprises:
(1) a tunable optical receiver capable of receiving data from the OLT via any of the plurality of wavelengths on the optical fiber,
(2) a tunable optical transmitter capable of transmitting data to the OLT via any of the plurality of wavelengths on the optical fiber, and
(3) a control element configured to interpret control data received from the OLT by the tunable optical receiver, the control data specifying a wavelength, and controlling the tunable optical transmitter to transmit data to the OLT on the specified wavelength,
wherein the OLT is configured to:
(a) receive data via a first wavelength from the first plurality of optical network units (ONUs) and the second plurality of ONUs,
(b) transmit data to each of the first plurality of ONUs and each of the second plurality of ONUs,
(c) in response to a detection of rogue ONU behavior associated with the first wavelength, request each of the second plurality of ONUs to switch from transmission of data on the first wavelength through the optical fiber to transmission of data on a second wavelength through the optical fiber while each of the first plurality of ONUs is controlled by the OLT to continue transmitting data on the first wavelength through the optical fiber,
(d) determine whether the first plurality of ONUs transmitting on the first wavelength are exhibiting rogue behavior,
(e) determine whether the second plurality of ONUS transmitting on the second wavelength are exhibiting rogue behavior,
(f) if the first plurality of ONUs are determined not to be exhibiting rogue behavior, confirm that each of the first plurality of ONUs is not rogue,
(g) if the second plurality of ONUs are determined not to be exhibiting rogue behavior, confirm that each of the second plurality of ONUs is not rogue,
(h) based on which of the first plurality of ONUs and the second plurality of ONUs have been confirmed not to be rogue, select a subset of the first plurality of ONUs or the second plurality of ONUs to move between the first wavelength and the second wavelength,
(i) request each of the selected subset of ONUs to switch transmission of data on one of the first wavelength and the second wavelength to transmission of data on the other of the first wavelength and the second wavelength,
(j) confirm that at least one of the first plurality of ONUs and the second plurality of ONUs is not rogue,
(k) repeat steps (h) select, (i) request, and (j) confirm until one of the first plurality of ONUs and the second plurality of ONUs is identified by the OLT to be rogue, and
(l) based on which of the first plurality of ONUs and the second plurality of ONUs is identified by the OLT as rogue, control the first plurality of ONUs and the second plurality of ONUs such that the ONU identified as rogue is prevented from interfering with transmissions by each of the first plurality of ONUs and the second plurality of ONUs confirmed not to be rogue.

6. The optical network of claim 5, wherein the OLT is configured to control, based on which of the first plurality of ONUs and the second plurality of ONUs is identified by the OLT as rogue, the first plurality of ONUs and the second plurality of ONUs such that a transmission wavelength of the ONU identified as rogue is isolated from a transmission wavelength of each of the first plurality of ONUs and the second plurality of ONUs confirmed not to be rogue.

7. A method for identifying and isolating rogue optical network units (ONUs) of an optical network, comprising:
(a) receiving, at an optical line terminal (OLT) of the optical network, data via a first wavelength from a first plurality of ONUs and a second plurality of ONUs, each of the first plurality of ONUs and the second plurality of ONUs coupled to the OLT by an optical fiber;
(b) transmitting data from the OLT through the optical fiber to each of the first plurality of ONUs and the second plurality of ONUs;
(c) in response to detection of rogue ONU behavior associated with the first wavelength, requesting by the OLT each of the second plurality of ONUs to switch from transmission of data on the first wavelength through the optical fiber to transmission of data on a second wavelength through optical fiber while each of the first plurality of ONUs is controlled by the OLT to continue transmitting data on the first wavelength through the optical fiber;
(d) determining by the OLT whether the first plurality of ONUs transmitting on the first wavelength are exhibiting rogue behavior;
(e) determining by the OLT whether the second plurality of ONUs transmitting on the second wavelength are exhibiting rogue behavior;
(f) if the first plurality of ONUs are determined, via the step (d) determining, not to be exhibiting rogue behavior, confirming by the OLT that each of the first plurality of ONUs is not rouge;
(g) if the second plurality of ONUs are determined, via the step (e) determining, not to be exhibiting rogue behavior, confirming by the OLT that each of the second plurality of ONUs is not rogue;
(h) based on which of the first plurality of ONUs and the second plurality of ONUs have been confirmed not to be rogue, selecting by the OLT a subset of the first plurality of ONUs or the second plurality of ONUs to move between the first wavelength and the second wavelength;
(i) requesting by the OLT each of the selected subset of ONUs to switch transmission of data from one of the first wavelength and the second wavelength to transmission of data on the other of the first wavelength and the second wavelength;
(j) confirming by the OLT that at least one of the first plurality of ONUs and the second plurality of ONUs is not rogue;
(k) repeating steps (h) selecting, (i) requesting, and (j) confirming by the OLT until one of the first plurality of ONUs and the second plurality of ONUs is identified by the OLT to be rogue; and
(l) based on which of the first plurality of ONUs and the second plurality of ONUs is identified by the OLT as rogue, controlling by the OLT the first plurality of ONUs and the second plurality of ONUs such that the ONU identified as rogue is prevented from interfering with transmissions by each of the first plurality of ONUs and the second plurality of ONUs confirmed not to be rogue.

8. The method of claim 7, wherein the controlling is performed such that a transmission wavelength of the ONU identified to be rogue is isolated from a transmission wavelength of each of the first plurality of ONUs and the second plurality of ONUs confirmed not to be rogue.

9. A method for identifying and isolating rogue optical network units (ONUs) of an optical network, comprising:
(a) receiving, at an optical line terminal (OLT) of the optical network, data via a first wavelength from a first plurality of ONUs and a second plurality of ONUs, each of the first plurality of ONUs and the second plurality of ONUs coupled to the OLT by an optical fiber;
(b) transmitting data from the OLT through the optical fiber to each of the first plurality of ONUs and the second plurality of ONUs;
(c) in response to detection of rogue ONU behavior associated with the first wavelength, requesting by the OLT each of the second plurality of ONUs to switch from transmission of data on the first wavelength through the optical fiber to transmission of data on a second wavelength through optical fiber;
(d) determining by the OLT whether the first plurality of ONUs are exhibiting rogue behavior after the second plurality of ONUs have switched to transmission of data on the second wavelength;
(e) determining by the OLT whether the second plurality of ONUs transmitting on the second wavelength are exhibiting rogue behavior;
(f) if the first plurality of ONUs are determined, via the step (d) determining, not to be exhibiting rogue behavior, confirming by the OLT that each of the first plurality of ONUs is not rouge;
(g) if the second plurality of ONUs are determined, via the step (e) determining, not to be exhibiting rogue behavior, confirming by the OLT that each of the second plurality of ONUs is not rogue;
(h) based on which of the first plurality of ONUs and the second plurality of ONUs have been confirmed not be to be rogue, selecting by the OLT a subset of the first plurality of ONUs or the second plurality of ONUs to move to a different wavelength relative to a wavelength on which the subset is currently transmitting,
(i) requesting by the OLT each of the selected subset of ONUs to switch transmission of data to the different wavelength;
(j) confirming by the OLT that at least one of the first plurality of ONUs and the second plurality of ONUs is not rogue;
(k) repeating steps (h) selecting, (i) requesting, and (j) confirming by the OLT until one of the first plurality of ONUs and the second plurality of ONUs is identified by the OLT to be rogue; and
(l) based on which of the first plurality of ONUs and the second plurality of ONUs is identified by the OLT as rogue, controlling by the OLT the first plurality of ONUs and the second plurality of ONUs such that the ONU identified as rogue is prevented from interfering with transmissions by each of the first plurality of ONUs and the second plurality of ONUs confirmed not to be rogue.

10. The method of claim 9, wherein the controlling is performed such that a transmission wavelength of the ONU identified to be rogue is isolated from a transmission wavelength of each of the first plurality of ONUs and the second plurality of ONUs confirmed not to be rogue.

* * * * *